(12) United States Patent
Haynold

(10) Patent No.: US 10,225,485 B1
(45) Date of Patent: Mar. 5, 2019

(54) METHOD AND APPARATUS FOR ACCELERATED TONEMAPPING

(71) Applicant: Oliver Markus Haynold, Evanston, IL (US)

(72) Inventor: Oliver Markus Haynold, Evanston, IL (US)

( * ) Notice: Subject to any disclaimer, the term of this patent is extended or adjusted under 35 U.S.C. 154(b) by 372 days.

(21) Appl. No.: 14/880,230

(22) Filed: Oct. 11, 2015

Related U.S. Application Data

(60) Provisional application No. 62/062,916, filed on Oct. 12, 2014.

(51) Int. Cl.
*G06T 5/00* (2006.01)
*H04N 5/235* (2006.01)
*G06T 5/50* (2006.01)

(52) U.S. Cl.
CPC ........... *H04N 5/2355* (2013.01); *G06T 5/007* (2013.01); *G06T 5/50* (2013.01); *G06T 2207/20208* (2013.01); *G06T 2207/20216* (2013.01)

(58) Field of Classification Search
CPC ......... H04N 5/2355; G06T 5/007; G06T 5/50; G06T 2207/20208; G06T 2207/20216
See application file for complete search history.

(56) References Cited

U.S. PATENT DOCUMENTS

| | | | |
|---|---|---|---|
| 5,247,366 A | 9/1993 | Ginosar et al. | |
| 5,420,635 A | 5/1995 | Konishi et al. | |
| 5,517,242 A | 5/1996 | Yamada et al. | |
| 5,929,908 A | 7/1999 | Takahashi et al. | |
| 6,148,149 A | 11/2000 | Kagle | |
| 6,204,851 B1 | 3/2001 | Netschke et al. | |
| 6,204,881 B1 | 3/2001 | Ikeda et al. | |
| 6,418,245 B1 | 7/2002 | Udagawa | |
| 6,496,226 B2 | 12/2002 | Takahashi et al. | |
| 6,538,593 B2 | 3/2003 | Yang et al. | |
| 6,593,970 B1 | 7/2003 | Serizawa et al. | |
| 6,670,993 B1 | 12/2003 | Yamamoto et al. | |
| 6,677,992 B1 | 1/2004 | Matsumoto et al. | |
| 6,707,492 B1 | 3/2004 | Itani | |

(Continued)

FOREIGN PATENT DOCUMENTS

| | | |
|---|---|---|
| EP | 0489552 A2 | 7/1992 |
| EP | 0572976 B1 | 4/1997 |

(Continued)

OTHER PUBLICATIONS

US 8,957,975, 02/2015, Venkataraman et al. (withdrawn)
US 8,957,978, 02/2015, Venkataraman et al. (withdrawn)

*Primary Examiner* — Robert J Craddock

(57) ABSTRACT

According to some embodiments, a camera captures images at a high dynamic range. These images are then tonemapped into images of a lower dynamic range with enhanced contrast. The contrast enhancement for a given pixel depends on the image's local contrast at a variety of different scales. Calculation of this contrast is accelerated by the camera creating a plurality low-pass filtered versions of the original image at progressively stronger low-pass filtering; these images may be stored at increasingly lower resolutions in a mipmap. Calculations are enhanced by use of a massively parallel processor and a texture mapping unit for hardware-accelerated sampling of blended averages of several pixels. Other embodiments are shown and discussed.

22 Claims, 5 Drawing Sheets

(56) References Cited

U.S. PATENT DOCUMENTS

| | | | |
|---|---|---|---|
| 6,720,993 B1 | 4/2004 | Hwang et al. |
| 6,894,720 B2 | 5/2005 | Zhang |
| 6,952,234 B2 | 10/2005 | Hatano |
| 6,985,185 B1 | 1/2006 | Crawford et al. |
| 7,061,524 B2 | 6/2006 | Liu et al. |
| 7,106,913 B2 | 9/2006 | Castorina et al. |
| 7,133,069 B2 | 11/2006 | Wallach et al. |
| 7,193,652 B2 | 3/2007 | Hori et al. |
| 7,239,757 B2 | 7/2007 | Kang et al. |
| 7,433,514 B2 | 10/2008 | Sloan |
| 7,454,136 B2 | 11/2008 | Raskar et al. |
| 7,518,615 B1 | 4/2009 | Airey et al. |
| 7,522,756 B2 | 4/2009 | Bueno et al. |
| 7,983,496 B2 | 7/2011 | Liu et al. |
| 8,014,445 B2 | 9/2011 | Segall et al. |
| 8,068,140 B2 | 11/2011 | Helbing |
| 8,072,507 B2 | 12/2011 | Fuh et al. |
| 8,159,579 B2 | 4/2012 | Jannard et al. |
| 8,237,730 B1 | 8/2012 | Anderson et al. |
| 8,242,426 B2 | 8/2012 | Ward et al. |
| 8,248,486 B1 | 8/2012 | Ward et al. |
| 8,290,295 B2 | 10/2012 | Criminisi et al. |
| 8,314,847 B2 | 11/2012 | Brunner |
| 8,340,413 B2 | 12/2012 | Cho et al. |
| 8,358,351 B2 | 1/2013 | Brunner et al. |
| 8,363,131 B2 | 1/2013 | Lin |
| 8,406,569 B2 | 3/2013 | Segall et al. |
| 8,452,090 B1 | 5/2013 | Brunner et al. |
| 8,456,547 B2 | 6/2013 | Wloka |
| 8,456,548 B2 | 6/2013 | Wloka |
| 8,456,549 B2 | 6/2013 | Wloka |
| 8,503,539 B2 | 8/2013 | Tran |
| 8,514,934 B2 | 8/2013 | Ward et al. |
| 8,634,476 B2 | 1/2014 | Tran |
| 8,643,769 B2 | 2/2014 | Frantz |
| 8,831,340 B2 | 9/2014 | Paris et al. |
| 8,885,059 B1 | 11/2014 | Venkataraman et al. |
| 8,896,719 B1 | 11/2014 | Venkataraman et al. |
| 8,902,321 B2 | 12/2014 | Venkataraman et al. |
| 8,989,484 B2 | 3/2015 | Moon et al. |
| 9,041,823 B2 | 5/2015 | Venkataraman et al. |
| 9,041,829 B2 | 5/2015 | Venkataraman et al. |
| 9,049,367 B2 | 6/2015 | Venkataraman et al. |
| 9,049,391 B2 | 6/2015 | Venkataraman et al. |
| 9,060,121 B2 | 6/2015 | Venkataraman et al. |
| 9,060,124 B2 | 6/2015 | Venkataraman et al. |
| 9,060,142 B2 | 6/2015 | Venkataraman et al. |
| 9,076,224 B1 | 7/2015 | Shah et al. |
| 9,077,893 B2 | 7/2015 | Venkataraman et al. |
| 2005/0168583 A1 | 8/2005 | Thomason |
| 2009/0092203 A1* | 4/2009 | Yu ............... H04L 27/2647 375/296 |
| 2011/0109754 A1 | 5/2011 | Matsunaga et al. |
| 2012/0147953 A1* | 6/2012 | El-Mahdy ............ H04N 19/61 375/240.03 |
| 2012/0230597 A1 | 9/2012 | Ward et al. |
| 2012/0237130 A1 | 9/2012 | Wang et al. |
| 2012/0314100 A1 | 12/2012 | Frank |
| 2013/0003086 A1 | 1/2013 | Mebane et al. |
| 2013/0034307 A1 | 2/2013 | Jerdev |
| 2013/0091430 A1 | 4/2013 | Zhai et al. |
| 2013/0322753 A1 | 12/2013 | Lim et al. |
| 2014/0078193 A1 | 3/2014 | Barnhoefer et al. |
| 2014/0140615 A1 | 5/2014 | Finlayson et al. |
| 2015/0054999 A1 | 2/2015 | Bock |
| 2015/0055001 A1 | 2/2015 | Bock |
| 2015/0178905 A1* | 6/2015 | Fletcher ............... G06K 9/4604 382/132 |
| 2015/0324662 A1* | 11/2015 | Garg .................. G06K 9/4661 382/165 |

FOREIGN PATENT DOCUMENTS

| | | |
|---|---|---|
| EP | 1302898 A2 | 4/2003 |
| EP | 2144444 A1 | 1/2010 |
| EP | 2411962 A1 | 2/2012 |
| EP | 2533520 A2 | 12/2012 |
| WO | 2011102887 A1 | 8/2011 |
| WO | 2012164296 A1 | 12/2012 |
| WO | 2014080068 A1 | 5/2014 |

* cited by examiner

METHOD AND APPARATUS FOR ACCELERATED TONEMAPPING

RELATED APPLICATIONS

This application claims priority from my Provisional Patent Application 62/062,916 for Method and Apparatus for Accelerated Tonemapping filed on 12 Oct. 2014, which is hereby incorporated in full into this application.

This application is related in subject matter to my patent application Ser. No. 14/280,605, filed on 17 May 2014, for an HDR Video Camera, which claims priority from my Provisional Patent Application 61/826,799, filed on 23 May 2013, and also for a HDR Video Camera; both applications are hereby incorporated in full into this application. It is also related in subject matter to my patent application Ser. No. 14/821,778 filed on 9 Aug. 2015, which claims priority from my Provisional Patent Application 62/040,373, filed on 21 Aug. 2014, for a Floating-Point Camera, both of which are also incorporated in full into this application.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of tonemapping images of high dynamic range, particularly in real-time applications such as cameras.

PRIOR ART

The following is a tabulation of some patent documents that appear relevant:

U.S. Patents

| Patent Number | Kind Code | Issue Date | Patentee |
|---|---|---|---|
| 5,247,366 | B1 | Sep. 21, 1993 | Genossar et al. |
| 5,420,635 | B1 | May 30, 1995 | Inuiya et al. |
| 5,517,242 | B1 | May 14, 1996 | Nakano et al. |
| 5,929,908 | B1 | Jul. 27, 1999 | Ikeda et al. |
| 6,148,149 | B1 | Nov. 14, 2000 | Kagle |
| 6,204,851 | B1 | Mar. 20, 2001 | Netschke et al. |
| 6,204,881 | B1 | Mar. 20, 2001 | Ikeda et al. |
| 6,418,245 | B1 | Jul. 9, 2002 | Udagawa |
| 6,496,226 | B2 | Dec. 17, 2002 | Takahashi et al. |
| 6,538,593 | B2 | Mar. 25, 2003 | Yang et al. |
| 6,593,970 | B1 | Jul. 15, 2003 | Serizawa et al. |
| 6,670,993 | B1 | Dec. 30, 2003 | Yamamoto & Yoneyama |
| 6,677,992 | B1 | Jan. 13, 2004 | Matsumoto et al. |
| 6,707,492 | B1 | Mar. 16, 2004 | Itani |
| 6,720,993 | B1 | Apr. 13, 2004 | Hwang & Heo |
| 6,894,720 | B1 | May 17, 2005 | Zhang |
| 6,952,234 | B2 | Oct. 4, 2005 | Hatano |
| 6,985,185 | B1 | Jan. 10, 2006 | Crawford et al. |
| 7,061,524 | B2 | Jul. 13, 2006 | Gamal & Liu |
| 7,106,913 | B2 | Sep. 12, 2006 | Battiato et al. |
| 7,133,069 | B2 | Nov. 7, 2006 | Wallach & Koselka |
| 7,193,652 | B2 | Mar. 20, 2007 | Hori & Hui |
| 7,239,757 | B2 | Jul. 3, 2007 | Kang et al. |
| 7,433,514 | B2 | Oct. 7, 2008 | Sloan |
| 7,454,136 | B2 | Nov. 18, 2008 | Raskar et al. |
| 7,518,615 | B1 | Apr. 14, 2009 | Airey et al. |
| 7,522,756 | B2 | Apr. 21, 2009 | Bueno et al. |
| 7,983,496 | B2 | Jul. 19, 2011 | Liu et al. |
| 8,014,445 | B2 | Sep. 6, 2011 | Kerofsky & Segall |
| 8,068,140 | B2 | Nov. 29, 2011 | Helbing |
| 8,072,507 | B2 | Dec. 6, 2011 | Chen et al. |
| 8,159,579 | B2 | Apr. 17, 2012 | DaSilva et al. |
| 8,237,730 | B1 | Aug. 7, 2012 | Anderson & Cook |
| 8,242,426 | B2 | Aug. 14, 2012 | Heidrich et al. |
| 8,248,486 | B1 | Aug. 21, 2012 | Ward et al. |
| 8,290,295 | B2 | Oct. 16, 2012 | Criminisi et al. |
| 8,314,847 | B2 | Nov. 20, 2012 | Brunner |
| 8,340,413 | B2 | Dec. 25, 2012 | Cho et al. |
| 8,358,351 | B2 | Jan. 22, 2013 | Brunner et al. |
| 8,363,131 | B2 | Jan. 29, 2013 | Lin |
| 8,406,569 | B2 | Mar. 26, 2013 | Segall et al. |
| 8,452,090 | B1 | May 28, 2013 | Brunner et al. |
| 8,456,547 | B2 | Jun. 4, 2013 | Wloka |
| 8,456,548 | B2 | Jun. 4, 2013 | Wloka |
| 8,456,549 | B2 | Jun. 4, 2013 | Wloka |
| 8,503,539 | B2 | Aug. 6, 2013 | Tran |
| 8,514,934 | B2 | Aug. 20, 2013 | Ward et al. |
| 8,634,476 | B2 | Jan. 21, 2014 | Tran |
| 8,643,769 | B2 | Feb. 14, 2014 | Frantz |
| 8,831,340 | B2 | Sep. 9, 2014 | Paris et al. |
| 8,885,059 | B1 | Nov. 11, 2014 | Venkataraman et al. |
| 8,896,719 | B1 | Nov. 25, 2014 | Venkataraman et al. |
| 8,902,321 | B2 | Dec. 2, 2014 | Venkataraman et al. |
| 8,957,975 | B2 | Feb. 17, 2015 | Venkataraman et al. |
| 8,957,978 | B2 | Feb. 17, 2015 | Venkataraman et al. |
| 8,989,484 | B2 | Mar. 24, 2015 | Moon et al. |
| 9,041,823 | B2 | May 26, 2015 | Venkataraman et al. |
| 9,041,829 | B2 | May 26, 2015 | Venkataraman et al. |
| 9,049,367 | B2 | Jun. 2, 2015 | Venkataraman et al. |
| 9,049,391 | B2 | Jun. 2, 2015 | Venkataraman et al. |
| 9,060,121 | B2 | Jun. 16, 2015 | Venkataraman et al. |
| 9,060,124 | B2 | Jun. 16, 2015 | Venkataraman et al. |
| 9,060,142 | B2 | Jun. 16, 2015 | Venkataraman et al. |
| 9,076,224 | B1 | Jul. 7, 2015 | Shah et al. |
| 9,077,893 | B2 | Jul. 7, 2015 | Venkataraman et al. |

U.S. Patent Application Publications

| Publication Number | Kind Code | Publication Date | Applicant |
|---|---|---|---|
| 2005,0168,583 | A1 | Aug. 4, 2005 | Thomason |
| 2011,0109,754 | A1 | May 12, 2011 | Matsunaga et al. |
| 2012,0147,953 | A1 | Jun. 14, 2012 | El-Mahdy et al. |
| 2012,0230,597 | A1 | Sep. 13, 2012 | Simmons et al. |
| 2012,0237,130 | A1 | Sep. 20, 2012 | Wang et al. |
| 2012,0314,100 | A1 | Dec. 13, 2012 | Frank |
| 2013,0003,086 | A1 | Jan. 3, 2013 | Mebane et al. |
| 2013,0034,307 | A1 | Feb. 7, 2013 | Jerdev |
| 2013,0091,430 | A1 | Apr. 11, 2013 | Zhai |
| 2013,0322,753 | A1 | Dec. 5, 2013 | Lim et al. |
| 2014,0078,193 | A1 | Mar. 20, 2014 | Barnhoefer & Jeter |
| 2014,0140,615 | A1 | May 22, 2014 | Finlayson & Singnoo |
| 2015,005,4999 | A1 | Feb. 26, 2015 | Bock |
| 2015,005,5001 | A1 | Feb. 26, 2015 | Bock |

Foreign Patents

| Patent Number | Kind Code | Issue Date | Patentee |
|---|---|---|---|
| EP 0,572,976 | B1 | Apr. 9, 1997 | Canon Kabushiki Kaisha |
| EP 1,302,898 | B1 | Oct. 4, 2006 | Zhang et al. |
| EP 1,500,045 | B1 | Oct. 11, 2006 | Philips Electronics N.V. |
| EP 2,144,444 | B1 | Jul. 27, 2012 | Banterle et al. |

Foreign Application Publications

| Publication Number | Kind Code | Publication Date | Applicant |
|---|---|---|---|
| EP 0,489,552 | A2 | Jun. 10, 1992 | Tindall |
| EP 2,411,962 | A1 | Feb. 1, 2012 | Hewlett-Packard Development Co. |
| EP 2,533,520 | A2 | Dec. 12, 2012 | Frank |
| WO 2,011,102,887 | A1 | Aug. 25, 2011 | Zhai et al. |

-continued

| WO 2,012,164,296 | A1 | Dec. 6, 2012 | Smith |
| WO 2014,080,068 | A1 | May 30, 2014 | Aarnio |

BACKGROUND

My patent application Ser. No. 14/280,605 and my patent application Ser. No. 14/821,778 teach a number of aspects of capturing and processing tonemapped HDR images, particularly for real-time video capture. Given that all known methods of tonemapping that produce high-quality tonemapped HDR, images are rather computationally expensive, there is an unmet need for improving the performance of this tonemapping so as to enable processing of higher resolutions and higher frame rates, in particular on affordable and compact mobile devices such as smartphones and hand-held cameras.

SUMMARY

According to some embodiments, a camera captures images at a high dynamic range. These images are then tonemapped into images of a lower dynamic range with enhanced contrast. The contrast enhancement for a given pixel depends on the image's local contrast at a variety of different scales. Calculation of this contrast is accelerated by the camera creating a plurality low-pass filtered versions of the original image at progressively stronger low-pass filtering; these images may be stored at increasingly lower resolutions in a mipmap. Calculations are enhanced by use of a massively parallel processor and a texture mapping unit for hardware-accelerated sampling of blended averages of several pixels. Other embodiments are shown and discussed.

Advantages

Some advantages of some embodiments include:
a) Use of a mipmap representation of the image to be tonemapped saves memory and memory bandwidth, thus allowing operation on devices constrained by available memory and memory bandwidth. Even where absolute memory available is not a problem, reducing memory use allows more efficient use of a GPU's memory cache.
b) Hardware-accelerated interpolation between pixels of mipmap levels greatly improves read performance.
c) Irregularly spaced sample points interpolated between pixels reduce artifacts in the tonemapped images.
d) Gaussian blurring at increasingly wide radii, respective to the image's dimensions, provides for very smooth output images and is accelerated by applying Gaussian blurring at relatively low radii, respective to the number of samples needed, at progressively reduced image resolutions.
e) Accordingly, some embodiments allow either the use of cheaper hardware to obtain the same image quality, resolution, and frame rate, or to improve image quality, resolution, and frame rate on the same hardware.
f) Tonemapping images as they are captured reduced storage needed for the captured image file, a particular advantage for video and on mobile devices
g) Efficient use of computational resources saves battery power, again a particular advantage on mobile devices
h) The operator may change tonemapping parameters for a video stream and see the results in real time

DRAWINGS—REFERENCE NUMERALS

Figure 1:
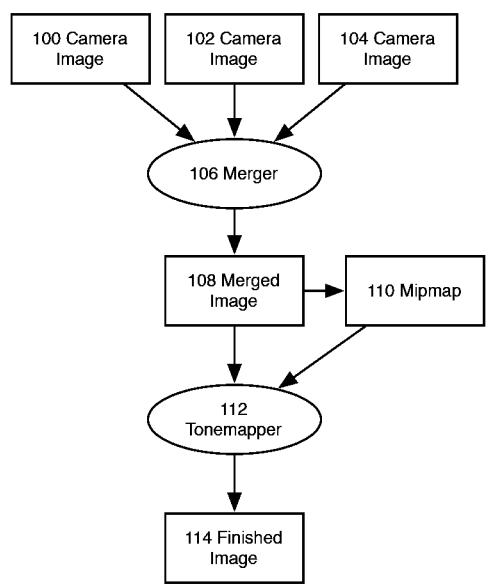
FIG. 1 shows the data flow of the first embodiment.

100 Camera image
102 Camera image
104 Camera image
106 Merging shader
108 Merged image
110 Mipmap of merged image
112 Tonemapper shader
114 Finished image
200 Pixel locations in current mipmap level
202 Pixel of interest
204 Sample point
300 Smartphone
302 Tonemapped video image
304 Tonemapping settings
400-422 labelled on drawing
500 HDR, camera image
502 Preprocessor filter
504 Preprocessed image
506 Horizontal blur filter
508 Vertical blur filter
510 Blurred luminance mipmap
512 Blurred luminance mipmap level 1
514 Blurred luminance mipmap level 2
516 Blurred luminance mipmap level 3
518 Blurred luminance mipmap level 4
520 Blurred luminance mipmap level n
522 Tonemapper filter
524 Finished image

DETAILED DESCRIPTION—FIGS. 1-4—FIRST EMBODIMENT

The first embodiment is a video camera capable of capturing images in high dynamic range and converting them in real time into a tonemapped video stream of lower dynamic range suitable for storage in a standardized video file format. The data flow of the first embodiment is shown in FIG. 1. This embodiment may be implemented as an 'app' on a smartphone. The smartphone may be the iPhone™ 6 made by Apple of Cupertino, Calif., which is capable of executing shaders written in the Metal™ language on its GPU. Alternatively, a GPU or digital signal processor on a different hardware platform may use, for example, the OpenGL® ES 3.0 Shading Language to implement the operations described. This first embodiment is a high-dynamic-range camera, which creates still images and movies of a much higher dynamic range than is natively possible with the phone's built-in sensor.

Figure 4:
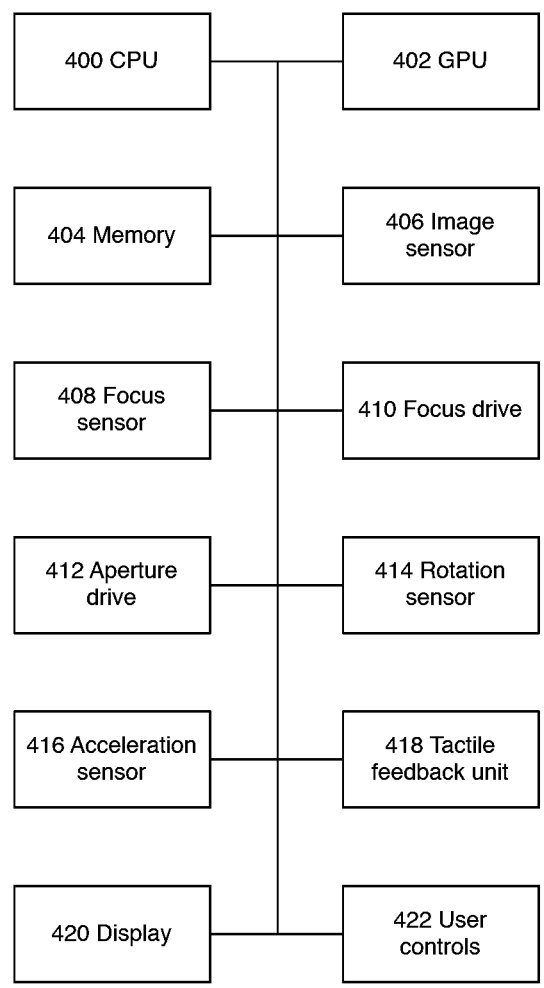
FIG. 4 shows the electronic components of the first embodiment.

FIG. 4 shows a schematic of various components that may be present in the first embodiment. There may be a central processing unit 400 and a graphics processing unit 402, which may be equipped with a texture mapping unit and an internal cache. There may be memory 404, which may be divided into volatile random-access memory (RAM) and non-volatile flash memory. RAM may be shared between the CPU 400 and the GPU 402, or the processors may use separate RAM. There may be an image sensor 406, a focus sensor 408, a focus drive 410, and an aperture drive 412. There may also be a rotation sensor 414 and an acceleration sensor 416 as well as a tactile feedback unit 418, a display 420 which may be a touchscreen, and a set of other user controls 422. Not all of these components need be present and some components may be present several times. Although in FIG. 4 all components are symbolically illustrated as being connected by a single bus system, they may be connected through several bus or other signal systems of different speeds and electrical properties.

For each video frame, for example 30 times per second, the control software of the app instructs the camera to take three exposures at different exposure biases 100, 102, and 104, for example one image with an exposure bias of 0, one with a bias of −2 EV units, and one with a bias of +2 EV units. These images are created by the built-in camera as 8-bit integer representations with three color channels, corresponding to Red, Green, and Blue. An integer value of 0 stands for no appreciable light at the pixel for that color channel, and an integer value of 255 represents sensor saturation for that pixel and channel. Alternatively, if the camera itself is capable of delivering images in high dynamic range, the control software may instruct the camera to take only one HDR exposure for each video frame.

The merger 106 may be implemented as a Metal compute shader in the Metal Shading Language. The three images 100, 102, and 104 from the camera get converted into Metal textures. The merger shader 106 then merges these 8-bit images into a merged image 108. The operation of this merging shader may be implemented as taught in my patent application Ser. No. 14/280,605 and my patent application Ser. No. 14/821,778. The output of this merging shader is an image in floating-point space and in the YUV color space with four color channels. The first channel encodes the logarithm, for example base 2, of the luminance in the merged image. So if the luminance of a pixel is fully saturated in the darkest of the three original exposures, the value of the logarithmic luminance channel in the merger's output texture would be 0. If the pixel has a luminance of one half the luminance that would correspond to full saturation, its value will be encoded as −1.

A special rule is needed where even the brightest of the original exposures records a value of zero on all color channels, and thus the measured luminance would be zero, corresponding to negative infinity in log space. To deal with this situation, we take any value of zero in a color channel of the brightest of the original three images (where the values may range from zero to 255) to mean a value of 0.5—the camera is not telling us about the complete absence of light, but merely that there is not enough light to trigger a sensor response.

The second and third color channels of the merged image output by the merging shader encode the chrominance values U and V of the merged pixel, also in floating-point representation. The width of the floating point numbers in the merged image may be any floating-point precision supported by the hardware, with 16 bit or 32 bit being common choices, depending on the hardware available and the quality of the images delivered by the camera. As of this writing, 16 bit tends to be sufficient for common smartphone cameras while 32 bit is advantageous for dedicated cameras that deliver higher image quality. On some hardware it is also advantageous to include a fourth color channel in the output image that may be set to zero so as to accommodate the hardware's or the driver's preference for four rather than three color channels.

Alternatively, if the camera itself delivers images in high dynamic range, such as 16-bit integers for each pixel and color channel, the merger may simply take one input image 100 and transform it into a representation where each pixel and color channel is represented by a 32-bit floating-point number. In this case, the term 'merger' is a bit of a misnomer since no images need to be merged.

We now have an image, stored as a Metal texture 108, that holds for each pixel the logarithm of the luminance in the first color channel and the chrominance in two additional color channels.

Alternatively, this image in texture 108 may be obtained directly from a sensor capable of providing images of high dynamic range from one exposure. For example, the Exmor RS™ image sensors made by Sony Corporation of Tokyo, Japan can generate images of substantial dynamic range and are being used in a number of smartphone cameras. For example, on the iPhone 6 made by Apple, HDR video directly from the sensor may be obtained by selecting an AVCaptureDeviceFormat where the property videoHDRSupported is set to YES. The tradeoff here is that using one exposure in HDR directly from the sensor reduces issues of ghosting and is faster than taking several exposures, but the dynamic range expansion achievable this way is lower than what could be obtained from combining several distinct exposures. The camera application may also allow the user the choice between two modes, one of which uses a single HDR exposure and one of which combines several exposures for each video frame.

The tonemapping shader 112 will need a mipmap representation of the texture 108. In Metal, this can be calculated by the method generateMipmapsForTexture: of MTLBlitCommandEncoder. In Open GL ES, the corresponding call would be to the glGenerateMipmap( ) function. Either way, we obtain a mipmap 110 attached to the texture 108. The mipmap calculation routine is highly optimized and very performant and makes use of the GPU's texture mapping unit for very fast access to input data.

Now the tonemapping shader 112 can calculate a tonemapped color value for each pixel. This tonemapping shader may be implemented as shown in the attached computer program listing Tonemapper1.metal. We will now discuss the kernel function tonemapper( ) in this listing in some level of detail.

At first, tonemapper( ) converts the position in the computation grid, which is expressed as integer values of pixel positions, into the coordinate system of the sampler, which is expressed in floating-point numbers between 0 and 1. The function reads out the value of the pixel at the present location into the variable yuv. Then the function calculates an adaptive luminance value yRef, which we will shortly discuss in more detail. Once that value is calculated, the function adapts the luminance of the present pixel, stored in log-space in the first component of yuv. It decreases global contrast by adding the term options.globalContrast*(yRef+1) to the luminance; remember that luminance is stored in log space base 2; so this term brings the value of the luminance closer to −1, corresponding to a luminance value of 0.5 in linear space; options.globalContrast should be a negative number. The function also increases local contrast by enhancing the difference between the pixel's original luminance and the yRef adaptive luminance, with a cutoff so that small contrasts that are likely noise are not enhanced. Finally, the function converts the pixel value into sRGB color space and writes it to the output texture. So far, this has been reasonably straightforward. The difficult part is the calculation of a proper value for yRef.

Ideally, the method we would like to use would work like this: We calculate a series of images, for example seven images, that are increasingly strong Gaussian blurs of the original luminance values, all in the same resolution as the original image. The width of the Gaussian blur in each of these images may increase in powers of two. Then in order to calculate yRef we look successively at each of these images. If the luminance value of the image at a given blur level is sufficiently close to the luminance value of the original pixel and/or the previous blur level, we say that the eye would recognize this luminance value to be in the neighborhood of the pixel's original luminance, value and use it for our calculation of adaptive brightness. We then use the next, more strongly blurred, image in the series to repeat this calculation. If the luminance value of the blur level is too different from the previous blur level's or the original pixel's luminance value, we break off the calculation. We may then use either the luminance value we encountered in the last blur level that was within the threshold or some weighted average of the luminance values of all the blur levels encountered until then as the adaptive luminance value. This method gives a reasonably good approximation to how the human eye evaluates the luminance of an image detail versus the detail's visual neighborhood. One may also want to use a kernel with a slightly different shape than Gaussian to compute the blurs, but either way one has to calculate the successive levels of blurred images.

The difficulty in this approach is that a Gaussian blur is expensive to compute. Theoretically, each pixel in an original image influences the value of each pixel in the Gaussian blur, so computational effort would increase enormously with the number of pixels. For practical image sizes that give attractive pictures, this is clearly not very useful. In practice, one can speed up the computation substantially by using a kernel that looks only at a smaller number of pixels, ignoring the pixels that have very little weight in the calculation, and by decomposing the blur into a horizontal and a vertical component, techniques well-known in the art. But still, computing nine levels of Gaussian blur with inspection of 9 pixels each in the horizontal and the vertical direction for an image of just one megapixel would take 9×(2×9)×1,000,000=162,000,000 texture reads. This is acceptable where computational power is plentiful, such as for processing a single image in high quality or on specialized camera hardware with powerful processors, but it is too slow for real-time video on affordable platforms like smartphones. We need a better solution; in some embodiments of the invention, this better solution works as shown for the calculation of yRef in the tonemapper( ) function, which we will discuss now.

As already described above, we are using a mipmap of the input image, a technique well-known in the art and made fast by aggressive hardware and driver optimization on virtually all modern GPUs and similar massively parallel processors. The mipmap takes up only one third of the storage space of the original image due to is use of successively smaller image sizes for higher mipmap levels.

The simplest possible way to calculate yRef now would be to read out the value for each mipmap level for the position of the pixel in question, i. e. to use nearest-neighbor interpolation, and to use each mipmap level in this way instead of the various levels of Gaussian blur we would really like to have if they were not so expensive to calculate. This approach would be blazing fast, but it would lead to ugly artifacts on the resulting pictures similar in appearance to very aggressive lossy image compression.

One simple way to improve this problem would be to use bilinear interpolation instead of nearest neighbor-interpolation to obtain the values of each mipmap level. In Apple's Metal framework this can be achieved by setting the minFilter and magFilter of the sampler used to obtain the pixel values to MTLSamplerMinMagFilterLinear, and in OpenGL ES it can be achieved by calling glTexParameteriv( ) to set GL_TEXTURE_MIN_FILTER and GL_TEXTURE_MAC_FILTER to GL_LINEAR. (In the particular application we are discussing, only the min filters matter.) This will replace squares with constant values corresponding to an entire region of the image represented by one pixel in the mipmap by a linear interpolation for each pixel's position, and will give much better results. It is also very fast. Even though calculating this linear interpolation accesses the values of four pixels instead of one from the corresponding mipmap level, this access is accelerated by the CPU's texture mapping unit and on many modern GPU's is hardly more expensive than reading just one pixel. There is also a good chance that the right pixel values will still be in cache for processing adjacent pixels which greatly reduces the memory bandwidth required. Bilinear interpolation for accessing the mipmap levels will give much better results than nearest-neighbor interpolation, but since bilinear interpolation gives notoriously discontinuous gradients at pixel edges, it will still create more artifacts than we are willing to tolerate for a high-quality output image.

The next improvement we introduce is to sample several locations adjacent to the location of the pixel we are interested in. For example, we could sample the value of each mipmap one pixel to the top, left, right, and bottom of the location we are interested in. Since each mipmap level has half the resolution of the previous level, the sampling distance expressed in floating-point coordinates increases by a factor of two for each mipmap level, as is expressed by sampleOffset being multiplied by 2 in each round of the calculation of yRef in the program listing. Thus, we are averaging the values of several samples, four in our case, to obtain a smoothed value yNew for our calculation of yRef. The computational cost of this is relatively low since each access gets accelerated by the texture mapping unit and the relevant pixels will often be in cache. Since this obtaining several samples and averaging them is in itself a blur operation, the first round of the calculation takes its samples not from the first reduced-size mipmap level, but from the full-size picture itself. So in effect, we're taking the information for our first blur level from the picture itself, the information for the second blur level from the first mipmap level, and so on.

Figure 2:
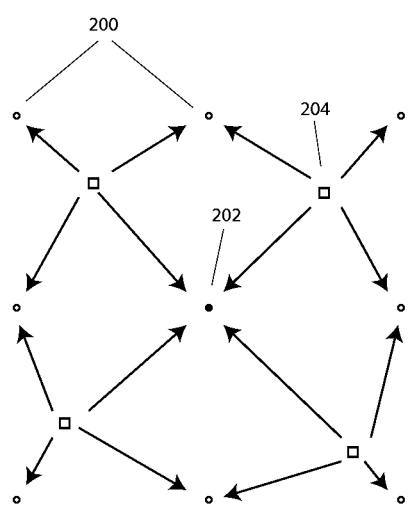
FIG. 2 shows the pixel access pattern of the tonemapper of the first embodiment.

This approach can be refined even more by varying the sampling locations slightly. In the program listing we can see that the sampler sometimes uses 0.6 and sometimes uses 0.75 time sampleOffset as the distance at which to take the sample. This irregularity further helps to reduce artifacts from gradient discontinuities at pixel boundaries. This access pattern is shown in FIG. 2, where the circles 200 show the pixel locations for the current mipmap level, 202 shows the pixel for which we wish to obtain a value, and the squares 204 show the sampling locations offset as given in tonemapper( ). The reader can see that with our four calls we are obtaining luminance information from nine pixels of the currently selected mipmap level.

So in summary our calculation of yNew in the program listing makes use of several techniques to obtain a good approximation of a Gaussian blur to be used for calculation of the adaptive brightness yRef at drastically reduced computational cost. First, we are using a mipmap instead of actually running a full Gaussian convolution. Second, we are using the interpolation provided by the CPU's texture mapping unit for extremely fast linear interpolations between adjacent pixels. Third, we are combining a small number, four in our case, although this may be varied as computational performance allows, of samples from each mipmap level into a smoothed value corresponding to that level. And fourth, we are taking these samples at somewhat irregular locations from the center of the pixel. Together, this gives us a good value for yRef that leads to nice tonemapping results even for difficult scenes or extreme values of local contrast improvement.

By repeating this process over and over for new exposures, for example 30 times per second, this processing logic can not only generate tonemapped still images but tonemapped movies rendered in real time as well. In 2014, the program listing shown was able to tonemap 720p video at 30 frames per second on Apple's iPhone™ 6 and still leave enough unused processor and GPU capacity for compressing and recording that video stream in addition to displaying it on screen.

In terms of performance improvement, we are making 7×4=24 sampling calls per pixel to calculate yRef whereas a Gaussian blur for seven levels would take at least ten times as many if it is to be in acceptable quality. Although we are only making 4 calls for each mipmap level, we are really looking at a neighborhood of 9 pixels; but we are letting the CPU's texture mapping unit average these into four values for us using hardware-accelerated linear interpolation. What is even more important than the reduced number of calls is the more compact memory representation from using the mipmap, which means that many more pixel values will be found in cache, leading to a drastic improvement in speed and reduced memory bandwidth required.

Figure 3:
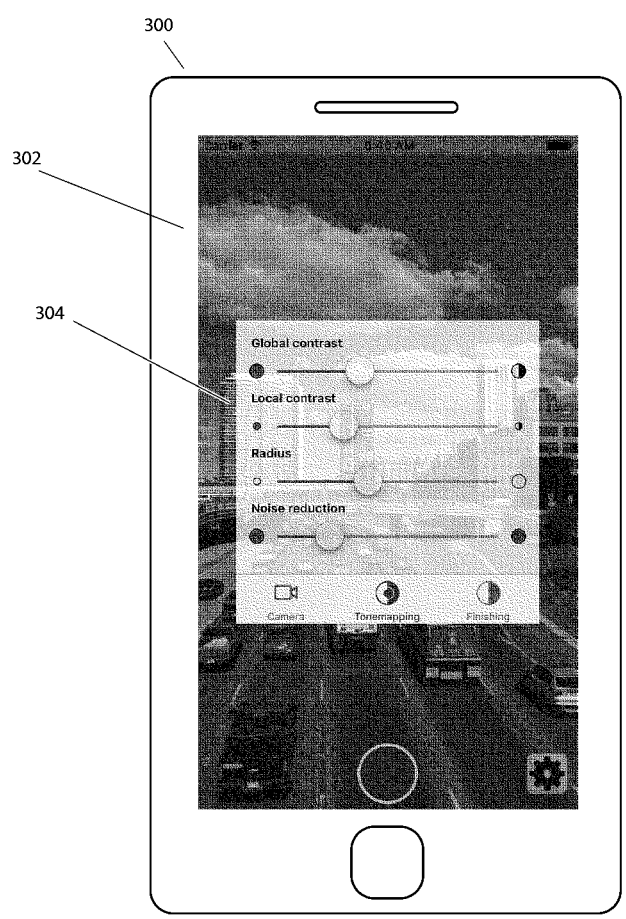
FIG. 3 shows the graphical user interface of the first embodiment.

FIG. 3 shows the graphical user interface of the first embodiment. The user can set the parameters going into tonemapperOptions in the program listing using sliders on the screen. Video processing is in real time at 30 frames per second, and thus the visual effect of changes in the settings becomes apparent immediately, allowing the user to fine-tune the desired effect.

SECOND EMBODIMENT—FIG. 5

The second embodiment is also a HDR video camera that may be serving a function similar to a the first embodiment, but with a different tradeoff between speed and image quality. The second embodiment will on many platforms be substantially more computationally intensive than the first embodiment, but in return it creates fewer artifacts visible even under extreme lighting conditions and may thus be used for more extreme tonemapping settings to capture scenes with even higher dynamic range or for artistic effect. Applicant's experiments have shown the second embodiment to be capable of recording tonemapped video with 30 frames per second in 1080p resolution on an iPhone™ 6S made my Apple of Cupertino, Calif. The general electrical architecture of the second embodiment may be as shown for the first embodiment in FIG. 4 and the user interface may look as shown for the first embodiment in FIG. 3.

Figure 5:
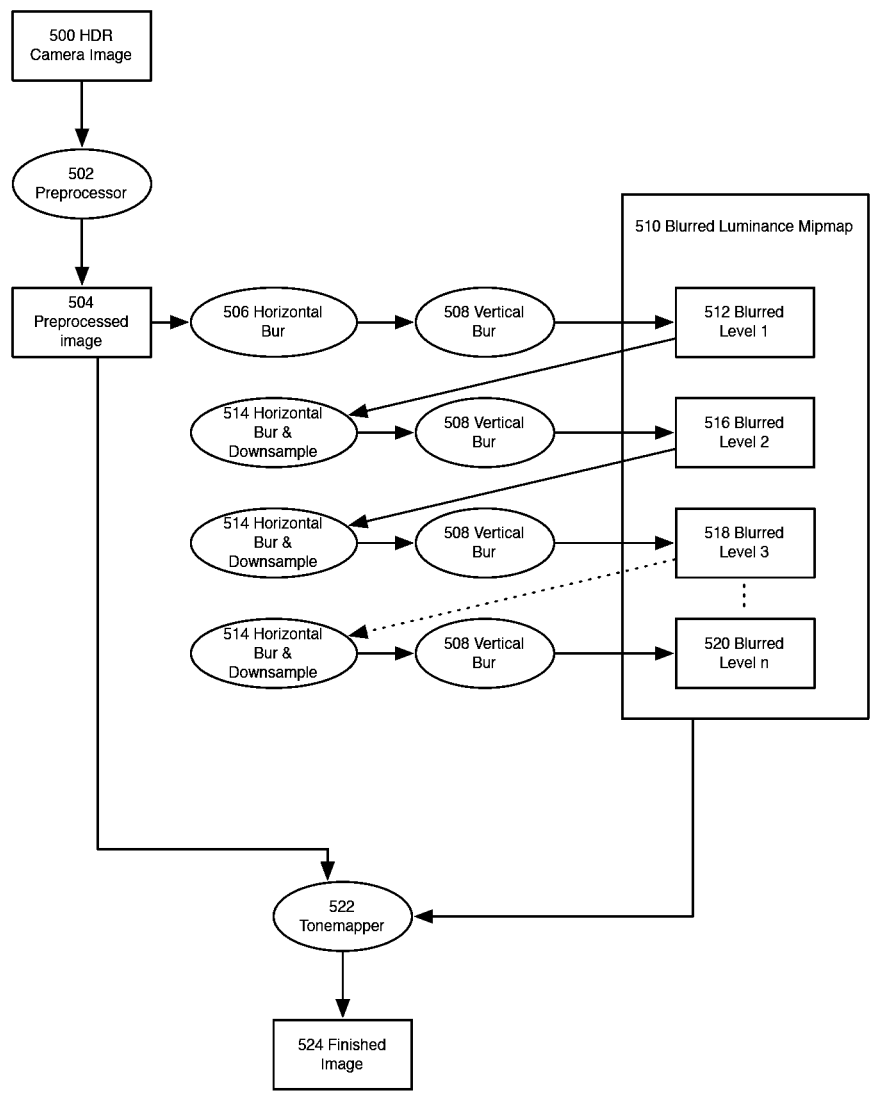
FIG. 5 shows the data flow of the second embodiment.

FIG. 5 shows the data flow of the second embodiment and Program Listing Tonemapper2.metal gives source code in the Metal™ Shading Language available on the iPhone™ 6S for the second embodiment.

The second embodiment starts with a raw RGB HDR image 500. This image may be either delivered directly from an image sensor capable of taking HDR exposures or it may be composed by a fusion of several image frames taken at different exposure parameters in a lower dynamic range.

Preprocessor 502 prepares the raw image for processing, and source code for it is given in the kernel sRGBA2YUV A in the program listing. For each pixel, the preprocessor reads in the color value and converts it into YUV color space. To avoid log values of negative infinity for a sensor reading of zero, the luminance value before the log is taken is clamped to a non-zero value of one bit more resolution than the resolution of the camera input. In the listing we assume that the incoming video frames are in high dynamic range, but still only with a depth of 8 bit per channel. Thus, we clamp the luminance value to values between $1/512$ and 1. Similarly, for a camera delivering 10 useful bits of luminance values, one would limit the luminance value to a minimum of $1/2048$, and so on. The preprocessor also compensates for the camera's reduced saturation at lower luminance values by calculating a saturation boost factor satBoost as $(1-Y)^2$ where Y is the luminance between 0 and 1. Finally, the preprocessor takes the binary logarithm of the luminance value for speed and convenience further down the data pipeline, multiplies the saturation values with satBoost, and stores the YUV values into the preprocessed image 504, which should be the same size in terms of height and width as the original image 504 and should be stored in a floating-point number format, such as IEEE 745 numbers in 16 or 32 bit for each pixel and color channel.

Next, a series of processing steps create the blurred luminance map 510 out of the preprocessed image 504. The blurred luminance map should be a GPU texture of the same height and width as the original image 500, preferably use the same floating-point representation as the preprocessed image 504, and should allocate memory for a mipmap representation; however, it only needs a single color channel for luminance.

Filters 506 and 508 in conjunction efficiently generate a Gaussian blur of the luminance channel of preprocessed image 504 in the highest-resolution mipmap level of image 510. Two-dimensional Gaussian blur is an operation that can be decomposed into two one-dimensional Gaussian blurs with great savings in computational effort. Thus filter 506, which is given in the listing as kernel horizGaussianBlur, performs a horizontal Gaussian blur, and filter 508, which is given in the listing as vertGaussianBlur performs a vertical Gaussian blur. The horizontal and vertical filters are identical except for their direction of operation. They both use the same method that was already used in the first embodiment to use the CPU's texture mapping unit to obtain weighted averages of several pixels with a single sampler call, except in the case of these two filters each sampler call can only average two pixels since no mixing of rows is needed when processing columns and the other way around. Thus the input parameter inSampler should be configured for at least bilinear interpolation between pixel coordinates. The Gaussian blur filters then use the fractional offsets stored in constant gaussianBlurOffsets to read a weighted average of two neighboring pixels at the appropriate offset from the pixel currently under consideration. Three offsets applies in both directions correspond to reads from five pixels (not six, since the central pixel is read twice), and the values thus red are blended into a weighted average using the weights gaussianBlurWeights. The offsets and weights given are chosen to give a good approximation to a Gaussian blur with $\sigma=2.5$ using five pixels, but those skilled in the art will be able to calculate appropriate constants for a different number of pixels (for example, with increasing availability of computational power, one may use seven or nine pixels instead of five) or a different, σ. Application of horizontal blur filter 506 followed by vertical blur filter 508 turns the luminance channel of preprocessed image 504 into a blurred, and thus low-pass filtered, version of the luminance channel of the same image at the same resolution.

In the next step, the camera fills out the higher mipmap levels of blurred luminance map 510 with increasingly more blurred versions of the first blurred luminance map 512 we just generated. Each mipmap level is generated by downsampling and applying further Gaussian blur to the previous mipmap level. Thus, to generate the second mipmap level 516, we first apply filter 514 for a Gaussian blur and downsample. Filter 514 may use the source code of kernel horizGaussianDownsampler in the program listing. The array horizGaussianDownsamplerOffsets provides non-integer horizontal offsets, and the kernel samples its input texture at these horizontal offsets. In the vertical, the sampling points will fall right into the center between two image rows (exactly so if the image's dimensions are powers of two, otherwise approximately so). Thus, each sampler call will use the CPU's texture mapping unit to obtain a weighted average of four pixels at once with computational cost that is not significantly higher than for obtaining only one pixel at once, providing for a speedy calculation of the blur. The offsets and the corresponding weights in horizGaussianDownsamplerWeight and horizGaussianDownsamplerZeroWeight are chosen so as to give a blur corresponding to σ=2.5. The output of the horizontal blur and downsample operation is then vertically blurred by the vertical blur filter 508, which is the same filter that was used for blurring the first mipmap level since downsampling is already done and thus the filter should generate and output image the size of its input image. This leads to the blurred luminance map for the second mipmap level 516. The process is then continued for increasingly smaller and more blurred representations of the image's luminance map into the third mipmap level 518, and so on for all mipmap levels up to the highest mipmap level 520, which is just one pixel by one pixel small.

This method for calculating a sequence of increasingly blurred, and thus low-frequency filtered, representation of the input image's luminance is advantageous over the first embodiment, provided that enough computational power is available, in that a Gaussian blur generates much smoother blurs than the 2×2 box blur typically used by the system-provided mipmap generation routines. Thus, with the parameters chosen for the blur radii, one can upsample the mipmap levels again to the source image's full resolution using linear interpolation and will hardly see any artifacts from that linear interpolation, which is not necessarily true in the first embodiment. The price to pay on many platforms is an increase in computational requirements compared to the first embodiment. Nonetheless, this method is fast enough to process 1080p video with 30 frames per second on the most modern consumer-oriented smartphones as of the time of this writing. Compared to the other possibility of generating Gaussian blurs of increasing blur radii, the method shown is vastly more computationally efficient, not only in memory but especially in computing operations and memory reads needed. To compute a Gaussian blur with an increased radius, the values of many more pixels become relevant, and thus one cannot get away, without introducing artifacts, with merely five or seven reads per column or row of the image. The second embodiment chooses a compromise between highest quality, and thus artifact avoidance, and computational efficiency by calculating the first blur in the full image resolution and then calculating all additional blurs with reduced image resolution and the same Gaussian blur radius in pixels as the first blur, which due to the increasingly lower image resolutions translates into increasingly high blur radii in terms of image dimensions. Thus, the blurred luminance map 510 gets generated as a Gaussian pyramid of the luminance channel of the preprocessed image 504 with increasingly lower image resolution and increasingly more Gaussian blur radius applied. Some embodiments may chose to use a kernel or storage method somewhat different from the Gaussian pyramid used here, for example a Laplace pyramid, which would just add additional kernels to subtract the Gaussian mipmap levels from each other, or a slightly different distribution of kernel weights, for example, so as to imitate some optical properties of the eye or processing properties of the visual cortex.

The tonemapper 522 then takes the preprocessed image 504 as well as the blurred luminance mipmap 510 and generates a tonemapped finished image 524. The algorithm used here is similar to that of the first embodiment, except that with the blurred luminance mipmap 510 being a high-quality Gaussian blur, it is no longer necessary to blend several reads for the values of each mipmap level when calculating a pixel's adaptive luminance. However, the GPU's texture mapping unit will still read four pixels from the higher mipmap levels and blend them by bilinear interpolation for each pixel considered. In line 170, the tonemapper squares the similarity value between two adjacent mipmap levels before using it to reduce the weight of the higher mipmap level in determining the reference luminance yRef. This causes a faster dropoff of weights for larger contrasts than a merely linear reduction of weightFactor, thus reducing the halo effects dreaded in tomenapping HDR pictures into LDR representations without reducing the enhancement of more subtle contrasts. Instead of squaring the weightFactor one may also use any other convex function, such as raising weightFactor to a power higher than one but other than two. This power may also be user-adjustable to allow the user to select an input parameter that will influence the tradeoff between contrast preservation and halo avoidance appropriate for a given scene.

The result is a beautifully tonemapped picture in image 524, rivaling the output quality of specialized HDR software for tonemapping HDR photographs on desktop computers, except that instead of using many seconds or minutes for a single image frame on a powerful desktop computer, the second embodiment can do this thirty times per second for a high-definition video frame on a smartphone, thus allowing the recording of HDR video, in addition to HDR photographs, tonemapped in real-time at the time of recording and ready for sharing as relatively compact LDR video files.

CONCLUSION, RAMIFICATIONS, AND SCOPE

Accordingly, the reader will see that the tonemapping method and apparatus described allows us to tonemap images at very high speed even on relatively modest consumer-grade hardware.

The most fascinating application of this is tonemapping HDR video in real-time. While it would in theory be desirable to record all the information captured in ever higher resolutions and ever higher dynamic, this would lead to a very large data volume, and indeed some professional and very high-priced video cameras are taking this approach. This would, however, be impractical for consumer-grade hardware that simply cannot handle the data volumes one would generate in this way. What is more, consumers typically like the instant satisfaction of immediately having a beautifully tonemapped video that they can watch and share on social networks instead of having to tonemap the video at a later time in a time-consuming process. At any rate, most video displays available today are not capable of displaying a dynamic range anywhere close to what can be found in nature and seen by the human eye, and thus preprocessing video to a lower dynamic range at the time of recording while still preserving details captured at a higher dynamic range provides memory- and bandwidth-efficient Output without losing anything in terms of display quality so long as the video files are not meant for extensive later editing.

Another benefit is that tonemapping is fast enough that the user can see the result of changing tonemapping parameters in real time. This allows users to experiment and find the best settings to bring out detail and achieve creative effects by experimentation with immediate feedback. This is particularly advantageous because enhancing local contrast at different spatial scales inherently involves as compromise between preserving and potentially enhancing local contrast that the eye would see if looking at the real scene without introducing too many artifacts, such as halos, as a result of reducing dynamic range. There is as of now no truly satisfying method of guessing the best parameters for this tonemapping automatically, and perhaps there never will be one since this compromise is inherently a matter of aesthetic taste and the mood one wants to set for an image. For example, in our contemporary culture, many videographers would show more aggressive enhancement of local contrast when recording a man's face than when recording a woman's face. Thus the ability to view the results of tonemapping a video stream in real time allows the videographer to experiment conveniently with different parameters and find the settings most suitable to a scene and a desired artistic message.

Yet another benefit is that the reduced computational effort required saves battery life on mobile devices.

Although the description above contains many specificities, these should not be construed as limiting the scope of the embodiments but as merely providing illustrations of some of several embodiments. For example, although we have given examples in the context of Apple's Metal framework to control a GPU, other languages, such as OpenGL® ES, OpenGL® or OpenCL™, may be used, or the massively parallel processing of floating-point math may be executed not on a GPU at all but on another type of massively parallel processor, such as an FPGA programmed for the purpose. We also assumed use of one camera in the embodiments shown, but it is equally possible to use the techniques described to merge not several images taken consecutively by one camera, but several images taken synchronously by multiple cameras built into the same device or by different sensor areas or sensors of the same camera, or, as discussed, directly one exposure from a sensor capable of capturing images in high dynamic range.

Thus the scope of the embodiments should be determined by the appended claims and their legal equivalents rather than by the examples given.

Program Listing: Tonemapper1.metal

```
// Tonemapper1.metal
//
// Written in Apple Metal Shading Language
//
```

Program Listing: Tonemapper1.metal

```
// © 2014 Oliver Markus Haynold
#include <metal_stdlib>
using namespace metal;
// Options to be passed to tonemapper
struct tonemapperOptions
{
    // Cutoff for adaptive luminance calculation
    float distanceCutoff;
    // Noise reduction strength
    float noiseCutoff;
    float globalContrast;
    float localConstrast;
    float gamma;
    float saturation;
};
// tonemapper ( ) converts an HDR YUV image into an LDR RGB image
//
// This is a Metal compute shader
//
// Parameters:
//    inTexture: texture containing the HDR YUV image, in
//               floating-point format
//               Red channel contains log2 of luminance
//               Green and Blue channels contain U and V chrominance
//               components
//    outTexture: texture where the result will be written into
//               colors will be translated into sRGB color space
//    sampler: should be set to
//       minFilter = MTLSamplerMinMagFilterLinear
//       magFilter = MTLSamplerMinMagFilterLinear
//       mipFilter = MTLSamplerMipFilterLinear
//    tonemapperOptions: struct as descibed above, can be used to change
//       tonemapping
//    gid: generated by the GPU
kernel void tonernapper(
    texture2d<float, access::sample> inTexture [[ texture(0) ]],
    texture2d<float, access::write> outTexture [[ texture(1) ]],
    sampler inSampler [[ sampler(0) ]],
    constant tonemapperOptions& options [[ buffer(0) ]],
    uint2 gid [[ thread_position_in_grid ]])
{
    // Obtain image scale and sampling position
    float scale_x = 1.0 / ((float) outTexture.get_width( ));
    float scale_y = 1.0 / ((float) outTexture.get_height( ));
    float2 pos = float2 ( ((float)gid.x) * scale_x ,
                         ((float)gid.y) * scale_y );
    // Obtain color from HDR image
    float4 inColor = inTexture.sample(inSampler, pos, level (0));
    float3 yuv = inColor.rgb;
    // Calculate adaptive luminance
    float yRef = yuv.r;
    float yPrev = yRef;
    float refWeight = 1.0;
    float refWeightSum = 1.0;
    float yNew;
    float2 sampleOffset = float2 (scale_x, scale_y);
    for (uint i = 0; i < 6; i ++)
    {
        yNew = (
           inTexture.sample(inSampler,
              pos + float2 (-0.6 * sampleOffset.x, - 0.75 * sampleOffset.y),
              level(i)).r +
           inTexture.sample(inSampler,
              pos + float2 (-0.75 * sampleOffset.x, 0.6 * sampleOffset.y),
              level (i)).r +
           inTexture.sample(inSampler,
              pos + float 2 (0.6 * sampleOffset.x, -0.6 * sampleOffset.y),
              level(i)).r +
           inTexture.sample(inSampler,
              pos + float2(0.75 * sampleOffset.x, 0.75 * sampleOffset.y),
              level(i)).r) / 4.0;
        refWeight *= clamp(1.0 - abs(yNew-yPrev) /
              options.distanceCutoff , 0.0, 0.9);
        yRef += refWeight * yNew;
        refWeightSum += refWeight;
        yPrev = yNew;
```

| Program Listing: Tonemapper1.metal |
|---|

```
        sampleOffset *= 2;
    }
    yRef /= refWeightSum;
    // Adjust image luminace
    float change = (yuv.r − yRef);
    if (change > options.noiseCutoff)
        change −= options.noiseCutoff;
    else if (change < −options.noiseCutoff)
        change += options. noiseCutoff;
    else
        change = 0.0;
    yuv.r += options.globalContrast * (yRef + 1);
    yuv.r += options.localConstrast * change;
    // Calculate RGB values
    yuv.r = pow(2.0, yuv.r);
    yuv.r = pow(yuv.r, options.gamma);
    yuv.g *= options.saturation;
    yuv.b *= options.saturation;
```

| Program Listing: Tonemapper1.metal |
|---|

```
    float3 rgb = float3x3(float3(1.0, 1.0, 1.0),
                    float3 (0.0, −0.21482, 2.12798),
                    float3 (1.28033, −0.38059, 0.0)) * yuv;
    // Convert to sRGB color space
    float red = rgb.r;
    if (red <= 0.0031308)
        red = 12.92 * red;
    else
        red = 1.055*pow(red, 1.0/2.4) − 0.055;
    float green = rgb.g;
    if(green <= 0.0031308)
        green = 12.92 * green;
    else
        green = 1.055*pow(green, 1.0/2.4) − 0.055;
    float blue = rgb.b;
    if(blue <= 0.0031308)
        blue = 12.92 * blue;
    else
        blue = 1.055*pow(blue, 1.0/2.4) − 0.055;
    outTexture.write(float4(red, green, blue, 0.0), gid);
}
```

| Program Listing: Tonemapper2.metal |
|---|

```
// Tonemapper2.metal
//
// Written in Apple Metal Shading Language
//
// © 2015 Oliver Markus Haynold
#include <metal_stdlib>
using namespace metal;
// Constants for blur with sigma = 2.5
constant float horizGaussianDownsamplerOffsets[ ] = {1.237510406, 2.227560554, 3.217681854};
constant float horizGaussianDownsamplerWeight[ ] = {0.148674942, 0.112680614, 0.072889103};
constant float horizGaussianDownsamplerZeroWeight = 0.331510681;
// Downsamples a monochrome mipmap layer into the next lower mipmap layer
// and performs Gaussian horizontal blur
kernel void horizGaussianDownsampler(
        texture2d<float, access::sample> inTexture [[texture(0)]],
        texture2d<float, access::write> outTexture [[texture(1)]],
        sampler inSampler [[sampler (0))]],
        uint2 gid [[thread_position_in_grid]])
{
    float scale_x = 1.0 / ((float) outTexture.get_width( ));
    float scale_y = 1.0 / ((float) outTexture.get_height( ));
    float2 pos = float2 ( ((float)gid.x) * scale_x, ((float)gid.y) * scale_y );
    float res = (inTexture.sample(inSampler, float2(pos.x, pos.y), level (0))).r
                    * horizGaussianDownsamplerZeroWeight;
    for(int i = 0; i < 3; i++)
        res += (inTexture.sample(inSampler,
                float2(pos.x + scale_x * horizGaussianDownsamplerOffsets[i], pos.y),
                            level (0)).r +
                inTexture.sample(inSampler,
                float2 (pos.x − scale_x * horizGaussianDownsamplerOffsets[i ], pos.y),
                            level (0)).r
                ) * horizGaussianDownsamplerWeight[i];
    outTexture.write (res, gid);
}
// Constant for blur with sigma = 2.5
constant float gaussianBlurOffsets[ ] = {0.648658382,2.40131234,4.327392983};
constant float gaussianBlurWeights[ ] = {0.233344414,0.198876038,0.067779548};
// Vertical monochrome Gaussian blur into image of same size
kernel void vertGaussianBlur(texture2d<float, access::sample> inTexture [[texture(0)]],
                    texture2d<float, access::write> outTexture [[texture(1)]],
                    sampler inSampler [[sampler(0)]],
                    uint2 gid [[thread_position_in_grid]])
float scale_x = 1.0 / ((float) outTexture.get_width( ));
float scale_y = 1.0 / ((float) outTexture.get_height( ));
float2 pos = float2 ( ((float)gid.x) * scale_x, ((float)gid.y) * scale_y );
float res = 0.0;
for(int i = 0; i < 3; i++)
    res += (inTexture.sample(inSampler, ,
            float2 (pos.x, pos.y + scale_y * gaussianBlurOffsets[i]), level(0)).r +
            inTexture.sample(inSampler ,
```

-continued

Program Listing: Tonemapper2.metal

```
                float2 (pos.x, pos.y - scale_y * gaussianBlurOffsets[i]), level(0)).r
            ) * gaussianBlurWeights [i];
    outTexture.write(res, gid);
}
// Horizontal monochrome Gaussian blur into image of same size
kernel void horizGaussianBlur (texture2d<float, access::sample> inTexture [[texture(0)]],
                               texture2d<float, access::write> outTexture [[texture(1)]],
                               sampler inSampler [[sampler(0)]],
                               uint2 gid [[thread_position_in_grid]])
{
    float scale_x = 1.0 / ((float) outTexture.get_width( ));
    float scale_y = 1.0 / ((float) outTexture.get_height( ));
    float2 pos = float2 ( ((float)gid.x) * scale_x, ((float)gid.y) * scale_y );
    float res = 0.0;
    for(int i = 0; i < 3; i++)
        res += (inTexture.sample(inSampler,
                float2 (pos.x + scale_x * gaussianBlurOffsets[i], pos.y), level(0)).r +
            inTexture.sample(inSampler,
                float2 (pos.x - scale_x * gaussianBlurOffsets[1], pos.y), level(0)).r
            ) * gaussianBlurWeights[i];
    outTexture.write(res, gid);
}
// Converts sRGB into YUV with Y log-encoded and adds saturation boost
kernel void sRGBA2YUVA(texture2d<float, access::read> inTexture[[texture(0)]],
                      texture2d<float, access::write> outTexture[[texture(1)]],
                      uint2 gid [[thread_position_in_grid]])
{
    float4 inColor = inTexture.read(gid);
    float red = inColor.r;
    if(red <= 0.04045)
        red = red / 12.92;
    else
        red = pow((red + 0.055)/1.055,2.4);
    float green = inColor.g;
    if (green <= 0.04045)
        green = green / 12.92;
    else
        green = pow((green + 0.055)/1.055,2.4);
    float blue = inColor.b;
    if(blue <= 0.04045)
        blue = blue / 12.92;
    else
        blue = pow((blue + 0.055)/1.055,2.4);
    float3 yuv = float3x3 (float3 (0.2126, -0.09991, 0.615),
                    float3 ( 0.7152, -0.33609, -0.55861),
                    float3 ( 0.0722, 0.436, -0.05639)) * float3 (red, green, blue);
    // We have 8-bit input, so for log processing clamp to one step down for 0 values
    yuv.r = clamp(yuv.r, 1.0/512.0, 1.0);
    float satBoost = (1.0 - yuv.r);
    satBoost *= satBoost * satBoost;
    satBoost += 1;
    yuv.r = log2 (yuv.r);
    yuv.g *= satBoost;
    yuv.b *= satBoost;
    outTexture.write(float4(yuv, inColor.w), gid);
}
struct tonemapperOptions
{
    float distanceCutoff;
    float noiseCutoff;
    float largeContrastCutoff;
    float globalContrast;
    float localConstrast;
    float gamma;
    float saturation;
};
// Provides final tonemapping
kernel void tonemapper(texture2d<float, access::read> inTexture [[texture(0)]],
                       texture2d<float, access::sample> blurTexture [[texture(1)]],
                       texture2d<float, access::write> outTexture [[texture(2)]],
                       sampler inSampler [[sampler(0)]],
                       constant tonemapperOptions& options [[buffer(0)]],
                       uint2 gid [[thread_position_in_grid]])
{
float scale_x = 1.0 / ((float) outTexture.get_width( ));
float scale_y = 1.0 / ((float) outTexture.get_height( )) ;
uint mipmapLevels = blurTexture.get_num_mip_levels( );
```

-continued

Program Listing: Tonemapper2.metal

```
float2 pos = float2( ((float)gid.x) * scale_x, ((float)gid.y) * scale_y );
float3 yuv = inTexture.read(gid).rgb ;
// Local adjustments
float yRef = yuv.r;
float yPrev = yRef;
float refWeight = 1.0;
float refWeightSum = 1.0;
float yNew;
float weightFactor;
for(uint i = 0; i < mipmapLevels; i++)
{
    yNew = blurTexture.sample(inSampler, pos, level(i)).r;
    weightFactor = clamp (1.0 - abs(yNew-yPrev) / options.distanceCutoff,
                      0.0, 0.95);
    refWeight *= weightFactor * weightFactor;
    yRef += refWeight * yNew;
    refWeightSum += refWeight;
    yPrev = yNew;
}
yRef /= refWeightSum;
float change = (yuv.r - yRef);
float achange = abs (change);
change *= clamp(achange / options.noiseCutoff, 0.0, 1.0)
        * clamp(3.0-achange/options.largeContrastCutoff,0.0,1.0);
yuv.r += options.globalContrast * (yRef + 1);
yuv.r += options.localConstrast * change;
// Global adjustments
yuv.r = pow (2.0, yuv.r);
yuv.r = clamp (yuv.r, 0.0, 1.0);
yuv.r = pow(yuv.r, options.gamma);
yuv.g * = options.saturation;
yuv.g = clamp (yuv.g, -1.0, 1.0);
yuv.b * = options.saturation ;
yuv.b = clamp (yuv.b, -1.0, 1.0);
// Write to GRAB format
float3 rgb = float3x3(float3 (1.0, 1.0, 1.0),
                  float3 (0.0, -0.21482, 2.12798),
                  float3 (1.28033, -0.38059, 0.0)) * yuv;
float red = rgb.r;
if (red <= 0.0031308)
    red = 12.92 * red;
else
    red = 1.055*pow(red, 1.0/2.4) - 0.055;
float green = rgb.g;
if (green <= 0.0031308)
    green = 12.92 * green;
else
    green = 1.055*pow(green, 1.0/2.4) - 0.055;
float blue = rgb.b;
if (blue <= 0.0031308)
    blue = 12.92 * blue;
else
    blue = 1.055*pow(blue, 1.0/2.4) - 0.055;
outTexture.write(float4 (green, red, 0, blue), gid);
}
```

I claim:

1. An apparatus for tonemapping a video stream, comprising at least one processor and memory,
    said processor being adapted to generate for each frame of said video stream a plurality of temporary representations of said frame in said memory with different levels of spatial low-pass filtering,
    to infer for each pixel of each frame of said video stream at least one parameter for said tonemapping, said parameter varying between pixels depending on the values of said low-pass filtered representations for the location of said pixel in said frame,
    and applying a tonemapping operator using said varying parameter to said video stream.

2. The apparatus of claim 1 where at least one of said low-pass filtered representations is stored at a lower resolution than the resolution of said video stream.

3. The apparatus of claim 2 where at least some of said low-pass filtered representations are stored as a mipmap.

4. The apparatus of claim 1 where said processor comprises a texture mapping unit providing hardware acceleration for blending the values of a plurality of pixels, said processor being adapted to use said blending provided by said texture mapping unit for generating said low-pass filtered image representations.

5. The apparatus of claim 1 where said processor is a graphics processing unit.

6. The apparatus of claim 1 where said processor is adapted to execute said tonemapping operation in a time interval no longer than the duration of said video frames.

7. The apparatus of claim 1 where said apparatus also comprises a camera and is adapted to apply said tonemapping substantively in real time to a video stream captured by said camera.

8. The apparatus of claim 1 where said apparatus also comprises a display for said video and is adapted to apply said tonemapping substantively in real time to video being displayed on said display.

9. The apparatus of claim 1 where application of said tonemapping operator generates output images of a lower dynamic range than the dynamic range of said frames of said video stream being tonemapped.

10. The apparatus of claim 1 where said low-pass filtering is substantively Gaussian blur.

11. The apparatus of claim 1 where said low-pass filtering is substantively box blur.

12. A method for tonemapping a video stream, comprising
receiving a video stream comprising a plurality of frames,
generating for each frame of said video stream a plurality of temporary representations of said frame in electronic memory with different levels of spatial low-pass filtering,
inferring for each pixel of each frame of said video stream at least one parameter for tonemapping, said parameter varying between pixels depending on the values of said low-pass filtered representations for the location of pixel in said frame,
applying a tonemapping operator using said varying parameter to said video stream resulting in a tonemapped video stream, and
outputting said tonemapped video stream.

13. The method of claim 12 where at least one of said low-pass filtered representations is stored at a lower resolution than the resolution of said video stream.

14. The method of claim 12 where at least some of said low-pass filtered representations are stored as a mipmap.

15. The method of claim 12 where said low-pass filtered representations are generated using a texture mapping unit providing hardware acceleration for blending the values of a plurality of pixels.

16. The method of claim 12 where said low-pass filtered representations are generated using a graphics processing unit.

17. The method of claim 12 where said method is executed for each of said frames in a time interval no longer than the duration of said video frames.

18. The method of claim 12 where said receiving a video stream is from a camera and where said method is executed for each of said frames substantively in real time.

19. The method of claim 12 where said outputting said tonemapped video stream is substantively in real time to a display.

20. The method of claim 12 where application of said tonemapping operator generates output images of a lower dynamic range than the dynamic range of said frames of said video stream being tonemapped.

21. The method of claim 12 where said low-pass filtering is substantively Gaussian blur.

22. The method of claim 12 where said low-pass filtering is substantively box blur.

* * * * *